US008390890B2

(12) United States Patent
Guo et al.

(10) Patent No.: US 8,390,890 B2
(45) Date of Patent: Mar. 5, 2013

(54) HALFTONE IMAGE GENERATION METHOD AND IMAGE PROCESSING SYSTEM AND COMPUTER PROGRAM PRODUCT THEREOF

(75) Inventors: Jing-Ming Guo, Taipei (TW); Yun-Fu Liu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 330 days.

(21) Appl. No.: 12/899,245

(22) Filed: Oct. 6, 2010

(65) Prior Publication Data
US 2011/0142340 A1 Jun. 16, 2011

(30) Foreign Application Priority Data
Dec. 15, 2009 (TW) .............................. 98142839 A

(51) Int. Cl.
*H04N 1/405* (2006.01)
*G06K 9/00* (2006.01)
(52) U.S. Cl. ..................... 358/3.03; 358/3.04; 358/3.01; 382/100
(58) Field of Classification Search .................. 358/3.03, 358/3.04, 3.01, 1.9; 382/100
See application file for complete search history.

(56) References Cited

U.S. PATENT DOCUMENTS
8,077,355 B2 * 12/2011 Guo et al. .................... 358/3.03

OTHER PUBLICATIONS
Jing-Ming Guo and Yun-Fu Liu; "IMproved Dot Diffusion by Diffused Matrix and Class Matrix Co-Optimization"; IEEE Transactions on Image Processing, vol. 18, No. 8, Aug. 2009.

* cited by examiner

*Primary Examiner* — Charlotte M Baker
(74) *Attorney, Agent, or Firm* — Wang Law Firm, Inc.; Li K. Wang; Stephen Hsu

(57) ABSTRACT

A halftone image generation method used in a system including an image input module and a halftoning processing module for generating a halftone image is disclosed. First, an original image is received by the image input module and a dot diffusion process is performed to the original image to generate the halftone image using a first class matrix with a first size and a corresponding first diffused weighting matrix with a first diffused area size, wherein the first class matrix indicates a processing order of the dot diffusion process and the first class matrix with the first size, the first diffused area size and the corresponding first diffused weighting matrix with the first diffused area size are optimized results determined in advance by the halftoning processing module according to class matrixes of different sizes and diffused areas of different sizes.

14 Claims, 13 Drawing Sheets

| 31 | 10 | 18 | 26 | 33 | 52 | 44 | 36 |
|----|----|----|----|----|----|----|----|
| 23 | 7  | 2  | 9  | 41 | 57 | 60 | 55 |
| 15 | 5  | 1  | 17 | 49 | 59 | 63 | 47 |
| 29 | 21 | 13 | 25 | 35 | 43 | 51 | 39 |
| 32 | 53 | 45 | 37 | 30 | 11 | 19 | 27 |
| 40 | 56 | 61 | 54 | 22 | 6  | 3  | 8  |
| 48 | 58 | 62 | 46 | 14 | 4  | 10 | 16 |
| 34 | 42 | 50 | 38 | 28 | 20 | 12 | 24 |

FIG. 2D

| 22 | 5 | 57 | 8 | 45 | 30 | 36 | 19 |
|---|---|---|---|---|---|---|---|
| 40 | 58 | 32 | 18 | 1 | 43 | 29 | 38 |
| 34 | 4 | 62 | 42 | 20 | 16 | 48 | 37 |
| 28 | 7 | 21 | 56 | 15 | 3 | 49 | 11 |
| 6 | 23 | 35 | 17 | 55 | 51 | 50 | 44 |
| 47 | 12 | 39 | 26 | 25 | 27 | 63 | 61 |
| 14 | 46 | 41 | 31 | 2 | 33 | 60 | 13 |
| 9 | 24 | 52 | 0 | 53 | 54 | 59 | 10 |

| | | | | | | | | | | | | | | | |
|---|---|---|---|---|---|---|---|---|---|---|---|---|---|---|---|
| 204 | 0 | 5 | 33 | 51 | 59 | 23 | 118 | 54 | 69 | 40 | 160 | 169 | 110 | 168 | 188 |
| 3 | 6 | 22 | 36 | 60 | 50 | 74 | 115 | 140 | 82 | 147 | 164 | 171 | 142 | 220 | 214 |
| 14 | 7 | 42 | 16 | 63 | 52 | 94 | 56 | 133 | 152 | 158 | 177 | 179 | 208 | 222 | 1 |
| 15 | 26 | 43 | 75 | 79 | 84 | 148 | 81 | 139 | 136 | 166 | 102 | 217 | 219 | 226 | 4 |
| 17 | 39 | 72 | 92 | 103 | 108 | 150 | 135 | 157 | 193 | 190 | 100 | 223 | 225 | 227 | 13 |
| 28 | 111 | 99 | 87 | 116 | 131 | 155 | 112 | 183 | 196 | 181 | 224 | 232 | 228 | 12 | 21 |
| 47 | 120 | 91 | 105 | 125 | 132 | 172 | 180 | 184 | 205 | 175 | 233 | 245 | 8 | 20 | 41 |
| 76 | 65 | 129 | 137 | 165 | 145 | 178 | 194 | 206 | 170 | 229 | 244 | 246 | 19 | 24 | 49 |
| 80 | 73 | 106 | 138 | 176 | 182 | 174 | 197 | 218 | 235 | 242 | 249 | 247 | 18 | 48 | 68 |
| 101 | 107 | 134 | 153 | 185 | 163 | 202 | 173 | 231 | 241 | 248 | 253 | 44 | 88 | 70 | 45 |
| 123 | 141 | 149 | 61 | 195 | 200 | 221 | 234 | 240 | 243 | 254 | 38 | 46 | 77 | 104 | 109 |
| 85 | 96 | 156 | 130 | 203 | 215 | 230 | 250 | 251 | 252 | 255 | 53 | 62 | 93 | 86 | 117 |
| 151 | 167 | 189 | 207 | 201 | 216 | 236 | 239 | 25 | 31 | 34 | 113 | 83 | 95 | 124 | 114 |
| 144 | 146 | 191 | 209 | 213 | 237 | 238 | 29 | 32 | 55 | 64 | 97 | 126 | 78 | 128 | 159 |
| 187 | 192 | 198 | 212 | 9 | 10 | 30 | 35 | 58 | 67 | 90 | 71 | 122 | 127 | 154 | 161 |
| 199 | 210 | 211 | 2 | 11 | 27 | 37 | 57 | 66 | 89 | 98 | 121 | 119 | 143 | 162 | 186 |

|         | 0.47972 |         |
|---------|---------|---------|
| 0.47972 |         | 0.47972 |
| 1       | X       | 1       |
| 0.47972 |         | 0.47972 |
|         | 0.47972 |         |

FIG. 9A

|         | 0.38459 |         |
|---------|---------|---------|
| 0.38459 |         | 0.38459 |
| 1       | X       | 1       |
| 0.38459 |         | 0.38459 |
|         | 0.38459 |         |

FIG. 9B

HALFTONE IMAGE GENERATION METHOD AND IMAGE PROCESSING SYSTEM AND COMPUTER PROGRAM PRODUCT THEREOF

CROSS REFERENCE TO RELATED APPLICATIONS

This Application claims priority of Taiwan Application No. 098142839, filed on Dec. 15, 2009, the entirety of which is incorporated by reference herein.

BACKGROUND OF THE INVENTION

1. Field of the Invention

The invention relates to image generation methods and related image processing systems, and more particularly, to halftone image generation method and related image processing system for converting a grayscale image into a halftone image using an improved dot diffusion method.

2. Description of the Related Art

Digital halftoning is a process to display grayscale images with a two-tone texture pattern. Halftoning is mainly used as printouts for materials such as magazines, newspapers, and books, generating a black-and-white format. Halftoning mainly takes advantage of the fact that the human visual system is not highly sensitive, so that black and white pixels of a dense uniform grid may be used to represent a desired grayscale effect. The halftoning methods include ordered dithering, dot diffusion, error diffusion, and direct binary search (DBS). Of these methods, the dot diffusion uses a class matrix and a diffused weighting and through parallel processing provides an acceptable image quality and faster processing efficiency. The dot diffusion generally used is the dot diffusion halftoning algorithm proposed by Knuth and Mese. The dot diffusion halftoning algorithm proposed by Knuth is a kind of algorithm that attempts to retain the advantages of error diffusion and simultaneously provide parallel processing. The dot diffusion has only one design parameter, namely the class matrix, which determines the order of the pixels to be halftone processed.

Based on the concept that in a class matrix the processing order will significantly affect the reconstruction image quality, the optimization proposed by Knuth aims to reduce the baron (no members of higher numerical value currently exist around the member being processed) and near-baron (only one member of higher numerical value currently exists around the member being processed) in the class matrix. Although this concept is simple and direct, the method does not consider the human visual characteristics, resulting in the generation of images that strain the human eyes. Based on an idea for improvement, Mese took into account the human visual characteristics in the optimization process of his class matrix.

However, Mese only used a single grayscale value 16 in the training set to obtain the final class matrix in his optimization process. The trained class matrix may not generate the best results when set in the natural images containing other grayscale values. Moreover, Mese's class matrix optimization process failed to take into account the diffused weighting value and the diffused area, thus limiting the space for the growth of the trained class matrix for the reconstruction of image quality.

BRIEF SUMMARY OF THE INVENTION

It is therefore an objective to provide halftone image generation methods and image processing systems to convert the original grayscale image into a halftone image using the dot diffusion halftoning technology, which is implemented at high efficiency and used to improve the quality of the halftone image output.

In one embodiment, a halftone image generation method used in a system for generating a halftone image is provided. The system at least includes an image input module and a halftoning processing module. First, an original image is received by the image input module. Thereafter, a dot diffusion process is performed to the original image to generate the halftone image by using a first class matrix with a first size and a corresponding first diffused weighting matrix with a first diffused area size, wherein the first class matrix indicates a processing order of the dot diffusion process and the first class matrix with the first size, the first diffused area size and the corresponding first diffused weighting matrix with the first diffused area size are optimized results determined in advance by the halftoning processing module performing a weighting calculation and a quality evaluation to at least one reference image according to class matrixes of different sizes and diffused areas of different sizes.

In another embodiment, an image processing system for generating a halftone image is provided. The system at least includes an image input module and a halftoning processing module. The image input module receives an original image. The halftoning processing module is coupled to the image input module and performs a dot diffusion process to the original image to generate the halftone image by using a first class matrix with a first size and a corresponding first diffused weighting matrix with a first diffused area size, wherein the first class matrix indicates a processing order of the dot diffusion process and the first class matrix with the first size, the first diffused area size and the corresponding first diffused weighting matrix with the first diffused area size are optimized results determined in advance by the halftoning processing module performing a weighting calculation and a quality evaluation to at least one reference image according to class matrixes of different sizes and diffused areas of different sizes.

Halftone image generation methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention can be more fully understood by reading the subsequent detailed description and examples with reference to the accompanying drawings, wherein:

FIG. 2C is a schematic illustrating an embodiment of that the error diffusion in the dot diffusion process can only be diffused to the dots not dealt with;

FIG. 2D shows an embodiment of a conventional 8×8 class matrix;

FIGS. 8A and 8B respectively show embodiments of class matrices according to the invention; and FIGS. 9A and 9B respectively show embodiments of diffused weighting matrices according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention relates to the image processing method, in which dot diffusion halftoning technology of higher implementation efficiency is used to convert the original image of a grayscale into a halftone image. The diffused area from a range of sizes is used to cope with the class matrix of different sizes (e.g., 8*8 and 16*16) when performing the optimization process, in order to obtain the best diffused weighting and the diffused area that can be used to improve the output halftone image quality. Based on the reason that halftone image quality obtained by the dot diffusion of this invention is the best dot diffusion by this stage, and for being able to retain inherent characteristics of parallel processing of dot diffusion, it is much higher than the already known diffusion method in the implementation efficiency, such as the direct binary search and error diffusion method.

Figure 1:
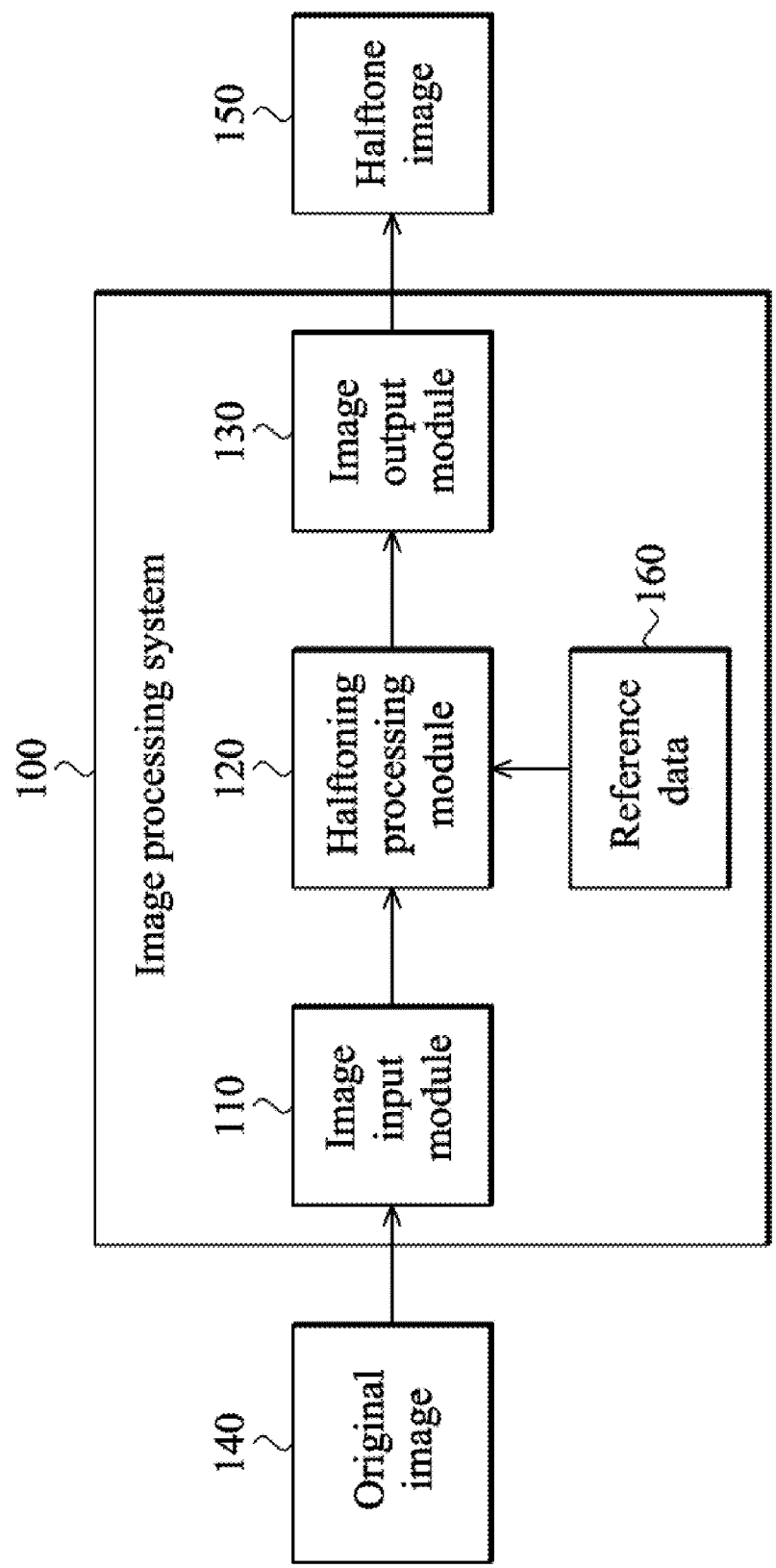
FIG. 1 shows an embodiment of a data processing system for generating halftone images according to the invention.

An image processing system for generating halftone images according to the invention is illustrated in the following. FIG. 1 shows an embodiment of an image processing system 100 for generating halftone images according to the invention. As shown in FIG. 1, the image processing system 100 at least comprises an image input module 110, a halftoning processing module 120, and an image output module 130. The image input module 110 reads an original image data 140 (e.g. a grayscale image). The halftoning processing module 120 is coupled to the image input module 110 for receiving the original image data 140 and using a reference data 160 including first class matrix with first size and a corresponding first diffused weighting matrix with first diffused area size to perform a dot diffusion process on the original image 140 to generate a halftone image 150. In the aforementioned, the first class matrix includes a processing order of dot diffusion and the first class matrix with the first size, the first diffused area size and the corresponding first diffused weighting matrix with the first diffused area size are optimized results determined in advance by the halftoning processing module 120. The halftoning processing module 120 may based on the class matrix of different sizes and the diffused area of different sizes to perform the weight calculation and quality assessment of one or more reference images to train and obtain the first class matrix with first size in these class matrixes, the first diffused area size in diffused areas, and the first diffused weighting matrix corresponding to the first class matrix in advance. Detailed description of how the halftoning processing module 120 uses the first class matrix with first size and corresponding first diffused weighting matrix with first diffused area size to perform a dot diffusion process on the original image 140 to generate a halftone image 150 are detailed below.

The image output module 130 is coupled to the halftoning processing module 120 for receiving the halftone images 150 generated by the halftoning processing module 120 and outputting the halftone image 150. For example, the image output module 130 may print out the halftone image 150.

In the embodiments of the invention, a grayscale or multi-scale image is converted to a halftone image by dot diffusion processes. Methods for calculation of converting a grayscale or multi-scale image to a halftone image by dot diffusion processes are well-known in the art, and thus detailed descriptions are omitted here for brevity while only results are listed in the following for reference.

Figure 2A:
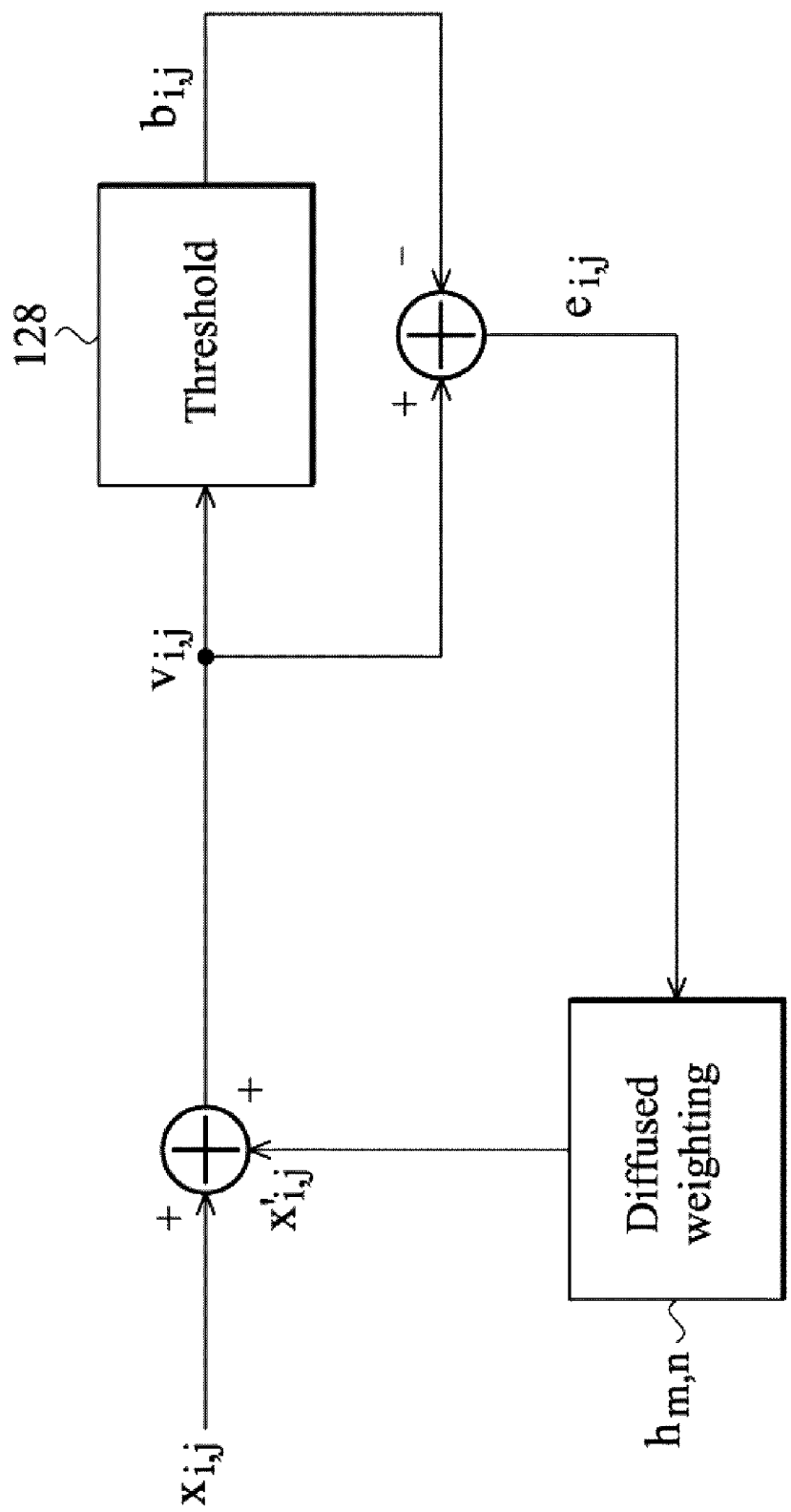
FIG. 2A is a schematic illustrating an embodiment of a standard dot diffusion process.
Figure 2B:
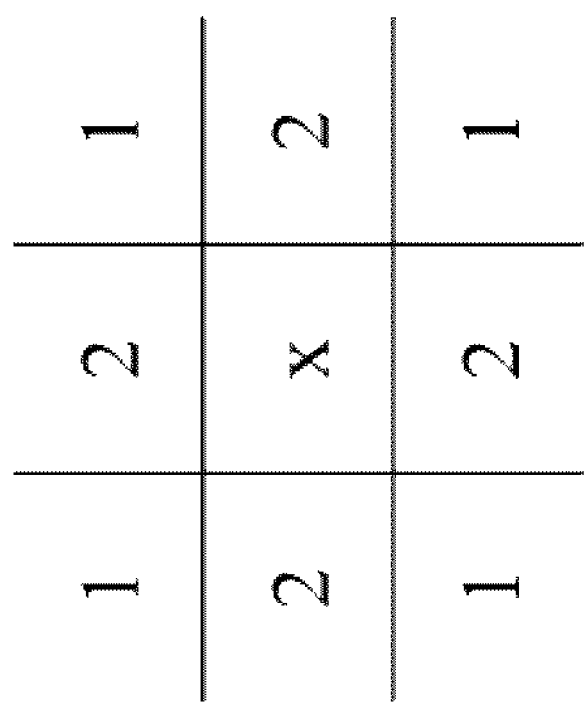
FIG. 2B shows an embodiment of a conventional diffused weighting matrix.

Please refer to FIG. 2A, which illustrates an embodiment of a standard dot diffusion process. In this embodiment, assume that the original image size is P×Q and is divided into many non-overlapping blocks in size M×N, each block corresponding to the same class matrix with the same block size in M×N, class matrix contains processing procedures for the dot diffusion, and treat one dot each time. It is assumed that the pixel value 255 is defined as a white pixel and the pixel value 0 is defined as a black pixel. The variable $x_{i,j}$ denotes the current input pixel value, and $x'_{i,j}$ denotes the diffused error sum added from the neighboring processed pixels. The variable $b'_{i,j}$ denotes a binary output at position (i, j) (that is, the output is either black or white). The variable $v_{i,j}$ denotes the modified gray output, and the $e_{i,j}$ denotes the difference between the modified grayscale output $v_{i,j}$ and the binary output $b_{i,j}$. The relationships of $b_{i,j}$, $v_{i,j}$, and $e_{i,j}$ are as below:

$$v_{i,j} = x_{i,j} + x'_{i,j}, \quad (1)$$

$$\text{where } x'_{i,j} = \sum_{m=-1}^{1} \sum_{n=-1}^{1} \frac{e_{i+m,j+n} \times h_{m,n}}{w}$$

$$e_{i,j} = v_{i,j} - b_{i,j}, \quad (2)$$

$$\text{where } b_{i,j} = \begin{cases} 0, & \text{if } v_{i,j} < 128 \\ 255, & \text{if } v_{i,j} \geq 128. \end{cases}$$

where the variable $h_{m,n}$ denotes diffused weighting. Please refer to FIG. 2B. FIG. 2B shows an embodiment of a conventional diffused weighting matrix, in which symbol x denotes the pixel position in processing, while the integer value of eight dots adjacent to x is the diffusion ratio. As shown in FIG. 2B, the additional diffusion scaling parameter 2 appeared at the neighborhood of right-angle is because that error at horizontal and vertical orientation is easier than that at the diagonal orientation to be detected, so it will have higher relevance. Please note that in the processing of dot diffusion procedures, the location of error allowing diffusion was only limited to the dots (i.e. pixels) not dealt with, and to determine whether the near pixels have been processed is to determine whether the member's value in the corresponding class matrix is greater than that of the pixel in processing.

Figure 2C:
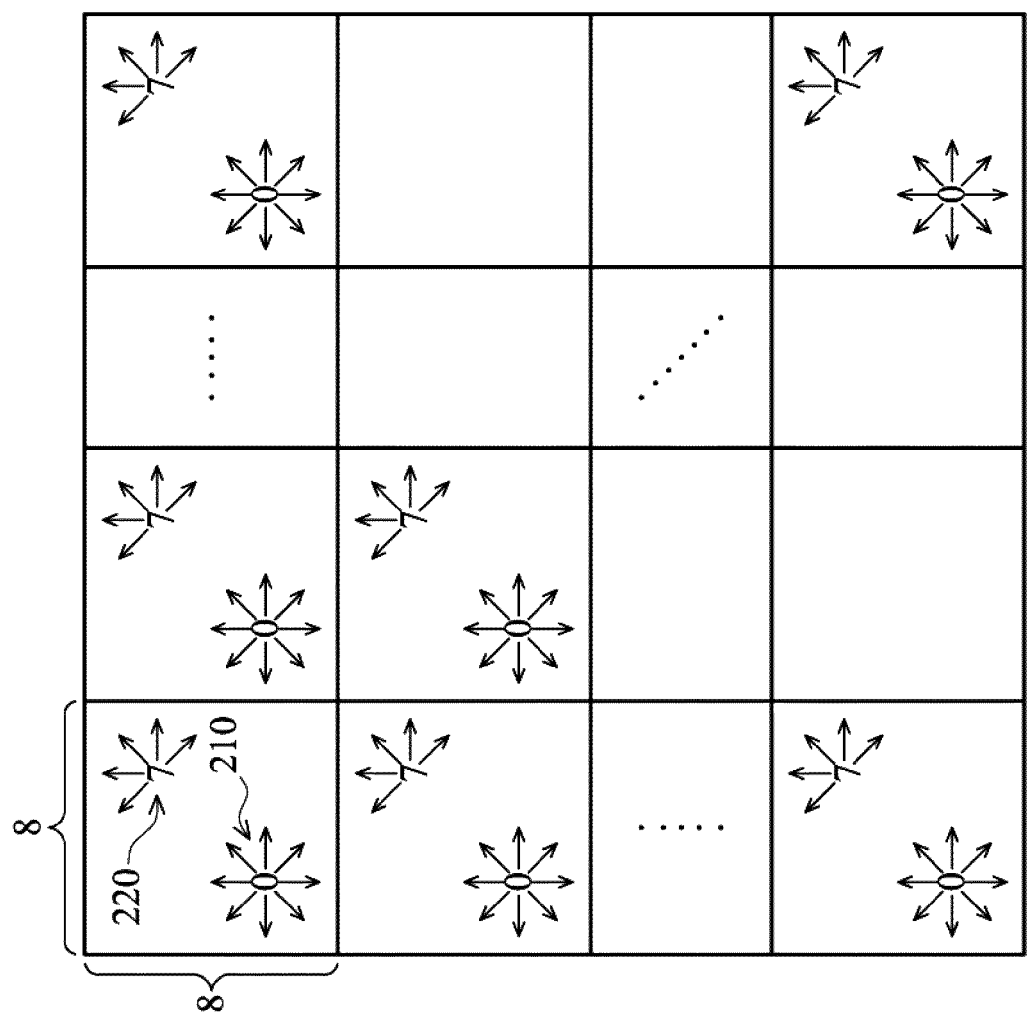

The formula $w = \sum_{m=-1}^{1} \sum_{n=-1}^{1} h_{m,n}^{1}$ indicates the summation of the diffused weights corresponding to those unprocessed pixels. FIG. 2C is a schematic illustrating an embodiment of that the error diffusion in the dot diffusion process can only be diffused to the dots not dealt with. As shown in FIG. 2C, assuming the class matrix shown in FIG. 2D is 8×8 matrix (that is, Knuth's class matrix), then in terms of position 0, it would have to be diffused to the surrounding eight points (as shown by 210), while for position 7, since the value of 1, 2, 5 is less than 7, only has to diffuse to surrounding 5 dots (as shown by 220). In addition, referring to FIG. 2C, due to the parallel processing property of dot diffusion, the pixels associated to the same value in the class matrix can be processed concurrently. Therefore, suppose the class matrix is of size 8×8, a dot-diffused image can be obtained in 64 time units.

Furthermore, in the following embodiments, the Peak Signal-to-Noise Ratio (hereinafter referred to as PSNR) will be used as an assessment criterion for the halftone image quality. The PSNR value may be an image quality difference measurement for images before and after the halftoning process, i.e. the original image 140 and the halftone image 150. Generally, the larger the PSNR value of the two images (i.e. the images before and after the halftoning process) is, the smaller the difference there between is. If the PSNR value of the two images exceeds 30 dB, the difference between the two images may not be visible to the human eye. Therefore, a PSNR value may be used as a reference value of a predicted result. For example, suppose a halftone image of size is P×Q, then the quality assessment PSNR may be defined as below:

$$PSNR = 10\log_{10}\frac{P \times Q \times 255^2}{\sum_{i=1}^{P}\sum_{j=1}^{Q}\left[\sum_{m,n\in R} w_{m,n}(x_{i+m,j+n} - b_{i+m,j+n})\right]^2},\quad (3)$$

where $x_{i,j}$ denotes the original grayscale image, $b_{i,j}$ denotes the halftone image, $w_{m,n}$ denotes the Least-Mean-Square (LMS) trained human visual filter at position (m,n), and R denotes the support region of the human visual filter (e.g. the size of the filter may be fixed at 7×7). Note that the value of $w_{m,n}$ can be obtained by the following formula:

$$\hat{x}_{i,j} = \sum_{m,n\in R} w_{m,n} b_{i+m,j+n},$$

$$e_{i,j}^2 = (x_{i,j} - \hat{x}_{i,j})^2,$$

$$\frac{\partial e_{i,j}^2}{\partial w_{m,n}} = -2e_{i,j}b_{i+m,j+n},$$

$$w_{m,n}^{(k+1)} = w_{m,n}^k + \mu e_{i+m,j+n}b_{i+m,j+n},$$

In which $w_{i,j,opt}$ stands for optimized LMS coefficient, $e_{i,j}^2$ is the Mean-Square-Error (MSE) of $x_{i,j}$ and $\hat{x}_{i,j}$, and $\mu$ is the convergence speed (in this embodiment: 10−5) used to adjust the optimization process of the LMS. If $w_{m,n} > w_{m,n,opt}$, then reduce the value of $w_{m,n}$, and when $w_{m,n} < w_{m,n,opt}$ then increase the value of $w_{m,n}$.

In addition, LMS filter describes in the following the human visual characteristics: (1) The sensitivity in the diagonal direction is lower than that in the orthogonal direction; and (2) the center of the filter has the highest sensitivity, and the sensitivity degree decreases with the increase of distance. This PSNR will be used to assist the assessment of halftone image quality in the following.

Figure 3:
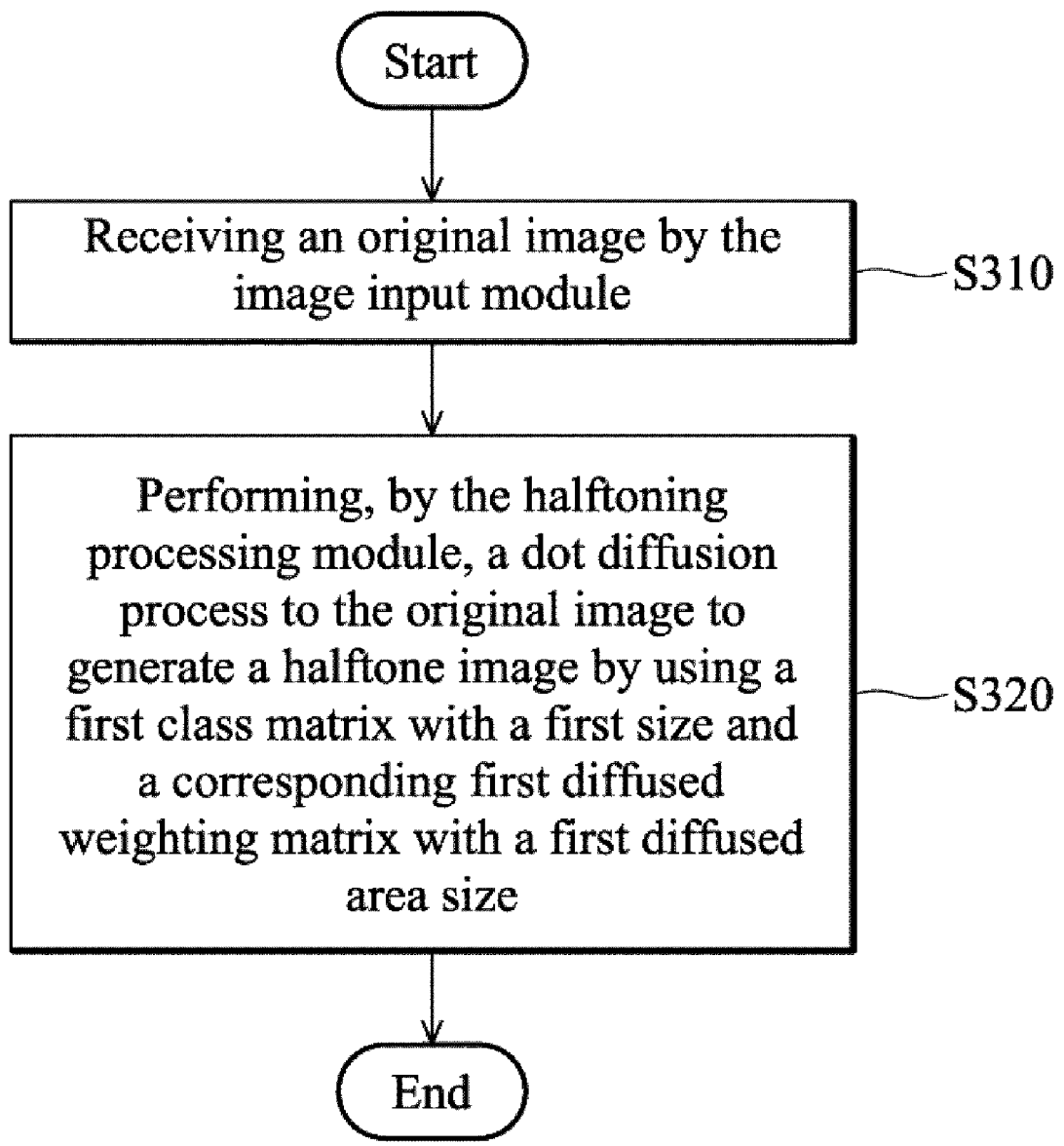
FIG. 3 is a flowchart showing an embodiment of a halftone image generation method according to the invention.

FIG. 3 is a flowchart showing an embodiment of a halftone image generation method according to the invention. In this embodiment, Generation of halftone images production will be explained.

First, in step S310, the image input module 110 receives an original image 140.

Then, in step S320, the halftoning processing module 120 performs a dot diffusion process to the original image 140 to generate a halftone image 150 by using a first class matrix with a first size and a corresponding first diffused weighting matrix with a first diffused area size. Among them, the first class matrix includes a processing order of the dot diffusion process, wherein the halftoning processing module 120 may perform a class matrix and diffused weighting co-optimization procedure in advance based on the various types of matrixes of different sizes (e.g. 8×8 and 16×16), as well as the multiple diffused areas of different sizes (e.g. 3×3, 5×5, 7×7, and 9×9) to perform weight calculation and quality assessment on one or more of the reference images in order to obtain the first class matrix with the first size in the class matrix, the size of the first diffused area in the first diffused area, and the first diffused weighting matrix that corresponds to the first class matrix. It is noted that the halftoning processing module 120 may directly utilize the obtained optimization result in subsequent halftoning processes without further optimization. In this step, the halftoning processing module 120 may, based on the original image 140, divide the original image 140 into several blocks. Then, the blocks in each area will carry out the dot diffusion procedure based on the first class matrix, diffused area size, and diffused weighting of the first diffused weighting matrix, generating the halftone image of 150.

In this invention, the optimization process of the class matrix co-optimizes the diffused weighting and class matrix, which include the swapping operations undertaken by the class matrix members and the adjustment operations of the diffused weighting in the diffused weighting matrix. The details are explained as follows.

Class Matrix and Diffused Weighting Co-Optimization

In this invention, the diffused weighting and class matrix are co-optimized, but this will result in combinations in access. In this part, the three limitations below shall serve as legal assumptions for three simplified combinations. The limitations are as follows:

(1) Out of all the diffused weightings in the diffused area, the closer a diffused weighting is to the central location, the higher its importance will be.

(2) The diffused weightings that are in the same Euclidean distance from the center are given the same weighting.

(3) The four horizontal and vertical positions that are the closest to the center have a fixed weighting of 1.

Figure 4:
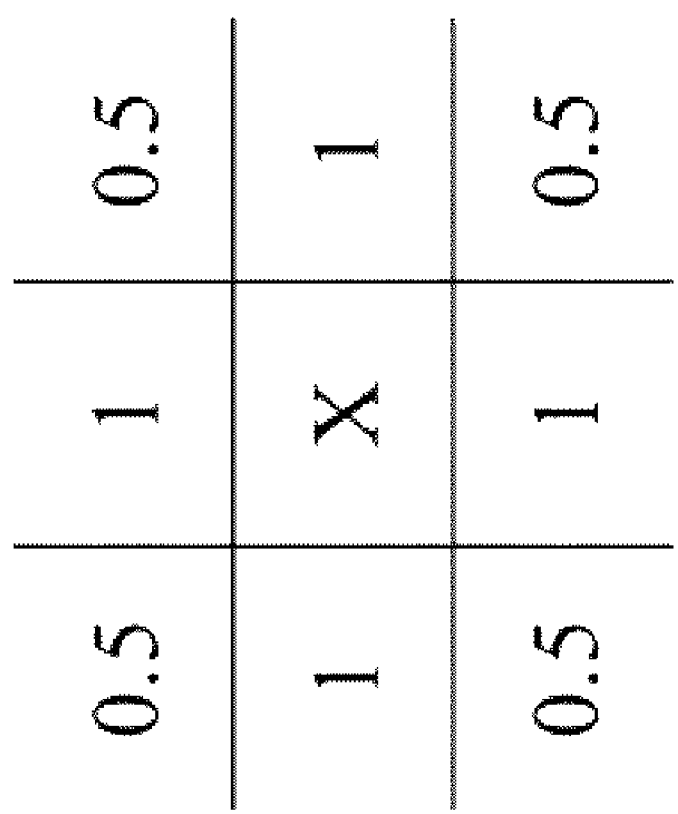
FIG. 4 shows an embodiment of a diffused weighting matrix according to the invention.

The first limitation takes into account the human visual characteristics while the second and third limitations are intended to reduce the coefficient of the number of possible combinations. For example, supposing the diffused weighting is of size 3×3, according to the above limitations, the diffused weighting can be simplified so that only one value in the corner needs optimization. Please refer to FIG. 4. FIG. 4 shows an embodiment of a diffused weighting matrix according to the invention. As shown in FIG. 4, x indicates the current processing location in which the four horizontal and vertical locations closest to the center are given the fixed weight of 1 while the diffused weightings in the sane Euclidean distance from the center are given the same weight value of 0.5.

Figure 5:
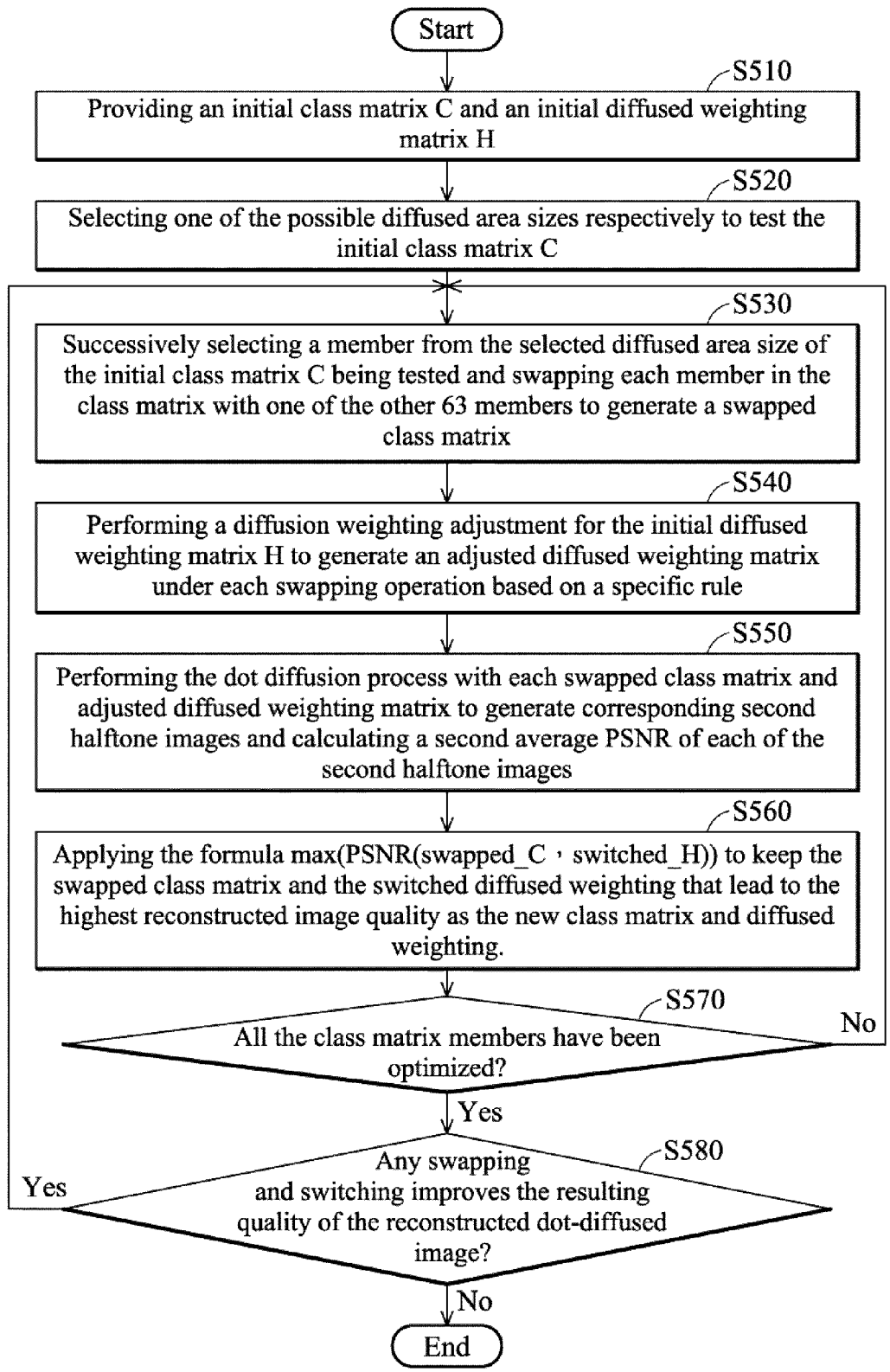
FIG. 5 is a flowchart showing an embodiment of a class matrix optimization procedure according to the invention.
Figure 6:
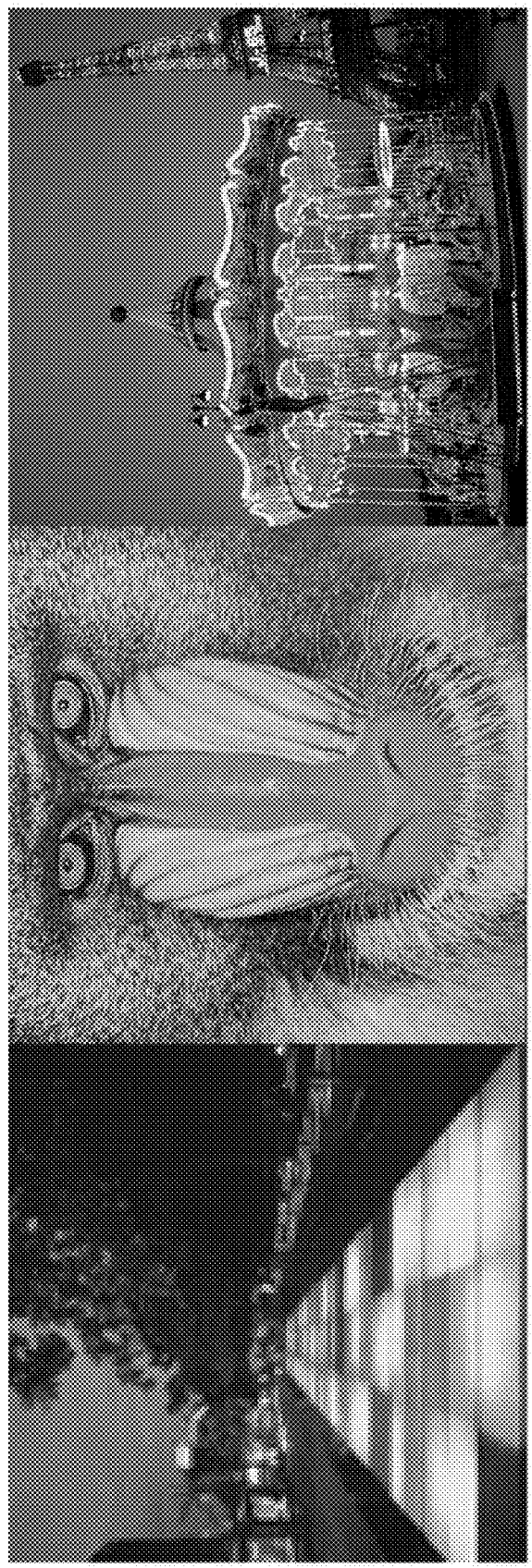
FIG. 6 is a schematic illustrating an embodiment of a reference image according to the invention.

Supposing the class matrix is of 8×8, in the optimization process, any member of the class matrix will engage in swapping with the rest of the 63 members while the different reference images in FIG. 6 will serve as the training set. FIG. 6 is a schematic illustrating an embodiment of a reference image according to the invention, of which any swapping operation includes a complete diffusion weighting optimization process and the adjustment precision of the coefficient is $10^{-15}$, that is, adjustments are $\pm 10^{-5}$ every time. In addition, the quality assessment criteria PSNR mentioned earlier will be applied to calculate the corresponding average PSNR (before and after swapping) obtained from the dot diffusion procedures. The highest PSNR member swapping location and corresponding diffused weightings obtained in the swapping process will be retained in order to carry on with the next optimization process until no further apparent image quality improvement. By this time, the final class matrix retained and diffused weightings shall serve as the outputted results for actual use. The detailed optimization process of the class matrix is illustrated in FIG. 5.

FIG. 5 is a flowchart showing an embodiment of a class matrix optimization procedure according to the invention for obtaining a first class matrix with the first size and the corresponding first diffused weighting matrix with the first diffused weighting area.

First, in step S510, the initial class matrix C and the initial diffused weighting matrix H are provided. In this embodiment, supposing the class matrix of FIG. 2D is the initial class matrix C, the diffused weighting matrix of FIG. 2C will serve as the initial diffused weighting matrix H.

In step S520, one of the possible diffused area sizes is selected respectively to test the initial class matrix C. Four diffused areas in the sizes of 3×3, 5×5, 7×7, and 9×9 are respectively used to test the initial class matrix C to obtain the diffused weightings in these areas. The initial class matrix C may be divided into blocks based on the sizes of the diffused areas (e.g. 3×3) selected. Then, with the blocks as the unit, the following optimization procedures may be performed.

In step S530, in sequence order, a member is successively selected from the selected size of the diffusion area of the initial class matrix C being tested and is swapped with each member in the class matrix with one of the other 63 members to generate a swapped class matrix. For example, supposing the member in the class matrix is a one-dimensional sequence, and the class matrix is of size 8×8, any member $C(i)$ of the class matrix will be successively swapped with one of the remaining 63 members $C(j)$, where $i \neq j$.

In step S540, under each swapping operation, a diffusion weighting adjustment is performed for the initial diffused weighting matrix H to generate an adjusted diffused weighting matrix based on a specific rule. In this step, the diffused weightings may be adjusted by adjusting $10^{-5}$ in all its coefficient values. During the diffused weighting generation, the specific rules are the three limiting conditions mentioned above, that is, coefficients of the horizontal and vertical locations closest to the center in the diffused areas are fixed to 1. Moreover, the locations with the same Euclidean distance from the center will set the same weighting values (See FIG. 4).

In step S550, the class matrix after every swapping and the diffused weighting matrix after every adjustment are used to perform the dot diffusion procedure to generate the corresponding second halftone images and calculate the second average PSNR of the generated second halftone images. In this step, the previous PSNR calculation equation can be used to obtain the second average PSNR for each of the second halftone images.

In step S560, the formula max(PSNR(swapped_C switched_H)) is applied to keep the swapped class matrix and the switched diffused weighting that lead to the highest reconstructed image quality as the new class matrix and diffused weighting. The highest PSNR member swapping location and the corresponding optimized diffused weighting obtained in the swapping process are retained to serve as the new class matrix and diffused weighting for the next round of optimization. The class matrix and adjusted diffused weighting combination after swapping will ensure better image quality. In this step, a quality assessment of the images before and after the swapping is performed to determine whether the image quality has been improved. If no change that improves the image quality has taken place, the class matrix and diffused weighting before the change shall be retained. After completing a round of optimization, in step S570, whether all the class matrix members have been optimized will further be determined. If so, step S580 will be performed. If some other members have not been processed (No in step S570), the flow returns to step S530 and another class matrix member $C(i)$ is chosen to allow the member to swapping with every remaining member in the diffused area and generate a class matrix. Steps S540 to S560 will be repeated.

In step S580, it is determined whether any swapping can improve the image quality obtained from the dot diffusion process. If so, it means optimization has not been completed and repeated operations of the steps from S530 to S570 is needed. If not (No in step S580), the optimization procedure will be terminated. Meanwhile, the final class matrix and diffused weighting matrix are the previously mentioned optimized first class matrix with the first size and the corresponding first diffused weighting matrix with the first diffused area size.

Figure 7:
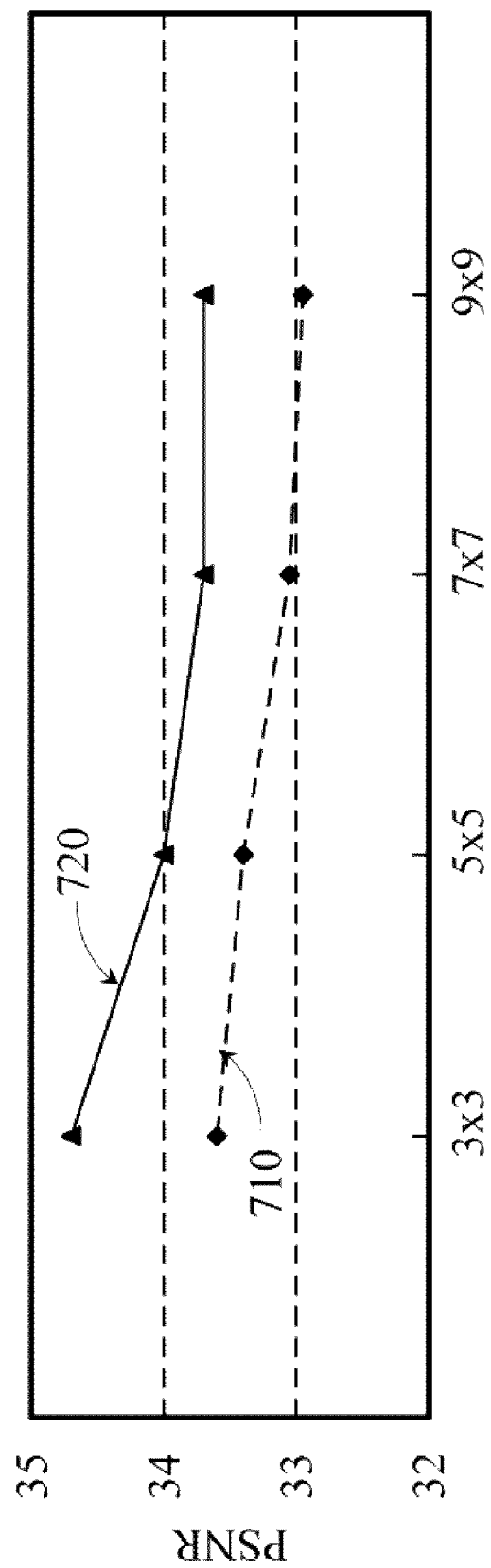
FIG. 7 is a schematic illustrating an embodiment of the average PSNR calculation results according to the invention.

For example, in one embodiment, supposing the sizes of the considered class matrix are 8×8 and 16×16 and the diffused area sizes are 5×5, 7×7 and 9×9, the previous optimization process can be used to obtain the 8 final convergent class matrix and diffused weighting combinations, taking into account the class matrixes of different sizes and the diffused weightings and areas. Then, the 8 class matrixes are used to test the different reference images as shown in FIG. 6 and carry out the dot diffusion procedure to obtain the average PSNR for quality assessment. The results are as shown in FIG. 7. FIG. 7 is a schematic illustrating an embodiment of the average PSNR calculation results according to the invention. The results have indicated that using the 8×8 and 16×16 class matrixes for the testing images in FIG. 6 the mean PSNR was obtained. The horizontal axis represents the LMS filter size while the vertical axis represents the corresponding PSNR value. As shown in FIG. 7, the curve 710 represents the average PSNR of the class matrix that measures 8×8 in size while the curve 720 represents the average PSNR of the class matrix that measures 16×16. It is observed from FIG. 7 that when the 3×3 diffused weighting is used, the PSNR is at its highest. The corresponding class matrices of 8×8 and 16×16 in size and with the highest PSNR are as shown in FIGS. 8A and 8B, and the corresponding diffused weightings are as shown in FIGS. 9A and 9B. Therefore, the class matrixes and diffused weightings in FIGS. 8A and 9A or 8B and 9B may be used in the future to perform dot diffusion processing and generate the required halftone images.

Therefore, according to the halftone images generation methods and related imaging processing systems of the invention, the improved dot diffusion processing method that targets the original grayscale or color scale image applications is used to carry out parallel processing to obtain halftone images. Of which, the diffused weightings and class matrixes take into account the human visual characteristics in the process of optimization in order to carry out image quality assessments. Therefore, when people look at the generated halftone images, they will have a more comfortable feel. Moreover, in the co-optimization process, images of multiple-color scales instead of single-color scales are used in actual applications of training. Hence, the class matrix trained can better meet the actual application needs. Furthermore, the halftone image generation method of the invention, similar to error diffusion, can be used to integrate the halftone image quality, which have the ordered dithering and parallel processing features needed to provide a high quality and high efficiency halftone imaging generating method, which is especially suitable when used on printers and for newspaper and magazine outputs.

It is understood that although each of the aforementioned modules or units of the invention has been illustrated as a single component of the system, two or more such components can be integrated together, thereby decreasing the number of the components within the system. Similarly, one or a multiple of the above components can be separately used, thereby increasing the number of the components within the system. In addition, the modules or the unit components of the invention can be implemented by any hardware, firmware, or software methods or combination thereof.

Systems and methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A halftone image generation method used in a system for generating a halftone image, wherein the system at least comprises an image input module and a halftoning processing module, comprising:
   receiving an original image by the image input module; and
   performing a dot diffusion process to the original image to generate the halftone image by using a first class matrix with a first size and a corresponding first diffused weighting matrix with a first diffused area size,
   wherein the first class matrix indicates a processing order of the dot diffusion process and the first class matrix with the first size, the first diffused area size and the corresponding first diffused weighting matrix with the first diffused area size are optimized results determined in advance by the halftoning processing module performing a weighting calculation and a quality evaluation to at least one reference image according to class matrixes of different sizes and diffused areas of different sizes,
   wherein the step of that the halftoning processing module performs the weighting calculation and the quality evaluation to at least one reference image according to class matrixes of different sizes and diffused areas of different sizes further comprises:
   providing an initial class matrix and an initial diffused weighting matrix
   respectively selecting one of the diffused area sizes to test the initial class matrix;
   successively selecting a member from the selected diffused area size of the initial class matrix being tested and swapping each member in the class matrix with one of the other remaining members to generate a swapped class matrix;
   performing a diffused weighting adjustment for the initial diffused weighting matrix to generate an adjusted diffused weighting matrix under each swapping operation based on a specific rule;
   performing the dot diffusion process with each swapped class matrix and each adjusted diffused weighting matrix to generate corresponding second halftone images;
   calculating a second average PSNR for each of the second halftone images; and
   obtaining the first class matrix and the corresponding first diffused weighting matrix according to each of the second average PSNRs,
   wherein the specific rule comprises configuring higher values for pixels nearer to the center of the diffused weighting matrix within the diffused weighting matrix, configuring a same value for pixels with the same Euclidean distance to the center of the diffused weighting matrix within the diffused weighting matrix and configuring a fixed value 1 for pixels which are vertical and horizontal four pixels nearest to the center of the diffused weighting matrix.

2. The halftone image generation method of claim 1, wherein the sizes of the class matrices at least comprise sizes of 8×8 and 16×16.

3. The halftone image generation method of claim 1, wherein the reference image is a natural image with multiple color levels.

4. The halftone image generation method of claim 1, wherein the step that the halftoning processing module performs the dot diffusion process to the original image to generate the halftone image by using the first class matrix with the first diffused area size and the corresponding first diffused weighting matrix with the first diffused area size further comprises:
   dividing the original image into a plurality of blocks with the first size; and
   performing the dot diffusion process for each of the blocks according to the first class matrix, the first diffused area size and the diffused weighting of the first diffused weighting matrix to generate the halftone image.

5. The halftone image generation method of claim 4, wherein each pixel of the halftone image is generated by the following formula:

$$v_{i,j} = x_{i,j} + x'_{i,j},$$

$$\text{where } x'_{i,j} = \sum_{m=-1}^{1} \sum_{n=-1}^{1} \frac{e_{i+m,j+n} \times h_{m,n}}{w},$$

$$e_{i,j} = v_{i,j} - b_{i,j},$$

$$\text{where } b_{i,j} = \begin{cases} 0, & \text{if } v_{i,j} < 128 \\ 255, & \text{if } v_{i,j} \geq 128, \end{cases}$$

wherein $x_{i,j}$ denotes the current processed input pixel value, $x'_{i,j}$ denotes the diffused error accumulated from neighboring processed pixels, $b_{i,j}$ denotes the binary output of the position (x,y), $v_{i,j}$ denotes the modified gray output, $e_{i,j}$ denotes the gray-level difference between the modified gray output $v_{i,j}$ and the binary output $b_{i,j}$, and $h_{m,n}$ denotes the diffused weighting corresponding to the pixel.

6. The halftone image generation method of claim 1, wherein the diffused area sizes at least comprises sizes of 3×3, 5×5, 7×7 and 9×9.

7. A computer product embodied on a non-transitory computer readable medium, which, when executed, causes a device to perform a halftone image generation method used in a system for generating a halftone image, comprising:

a first program code, receiving an original image from the image input module; and a second program code, performing a dot diffusion process to the original image to generate the halftone image by using a first class matrix with a first size and a corresponding first diffused weighting matrix with a first diffused area size, wherein the first class matrix indicates a processing order of the dot diffusion process and the first class matrix with the first size, the first diffused area size and the corresponding first diffused weighting matrix with the first diffused area size are optimized results determined in advance by the second program code performing a weighting calculation and a quality evaluation to at least one reference image according to class matrixes of different sizes and diffused areas of different sizes, wherein the step of that the second program code performs the weighting calculation and the quality evaluation to at least one reference image according to class matrixes of different sizes and diffused areas of different sizes further comprises;

providing an initial class matrix and an initial diffused weighting matrix respectively selecting one of the diffused area sizes to test the initial class matrix;

successively selecting a member from the selected diffused area size of the initial class matrix being tested and swapping each member in the class matrix with one of the other remaining members to generate a swapped class matrix;

performing a diffused weighting adjustment for the initial diffused weighting matrix to generate an adjusted diffused weighting matrix under each swapping operation based on a specific rule;

performing the dot diffusion process with each swapped class matrix and each adjusted diffused weighting matrix to generate corresponding second halftone images;

calculating a second average PSNR for each of the second halftone images: and obtaining the first class matrix and the corresponding first diffused weighting matrix according to each of the second average PSNRs, wherein the specific rule comprises configuring higher values for pixels nearer to the center of the diffused weighting matrix within the diffused weighting matrix, configuring a same value for pixels with the same Euclidean distance to the center of the diffused weighting matrix within the diffused weighting matrix and configuring a fixed value 1 for pixels which are vertical and horizontal four pixels nearest to the center of the diffused weighting matrix.

8. An image processing system for used in a system for generating a halftone image, comprising:

an image input module, receiving an original image by the image input module; and a halftoning processing module implemented by a processor, coupled to the image input module, performing a dot diffusion process to the original image to generate the halftone image by using a first class matrix with a first size and a corresponding first diffused weighting matrix with a first diffused area size, wherein the first class matrix indicates a processing order of the dot diffusion process and the first class matrix with the first size, the first diffused area size and the corresponding first diffused weighting matrix with the first diffused area size are optimized results determined in advance by the halftoning processing module performing a weighting calculation and a quality evaluation to at least one reference image according to class matrixes of different sizes and diffused areas of different sizes, wherein the halftoning processing module further provides an initial class matrix and an initial diffused weighting matrix, respectively selects one of the diffused area sizes to test the initial class matrix, successively selects a member from the selected diffused area size of the initial class matrix being tested and swaps each member in the class matrix with one of the other remaining members to generate a swapped class matrix, performs a diffused weighting adjustment for the initial diffused weighting matrix to generate an adjusted diffused weighting matrix under each swapping operation based on a specific rule, performs the dot diffusion process with each swapped class matrix and each adjusted diffused weighting matrix to generate corresponding second halftone images, calculates a second average PSNR for each of the second halftone images and obtains the first class matrix and the corresponding first diffused weighting matrix according to each of the second average PSNRs, and wherein the specific rule comprises configuring higher values for pixels nearer to the center of the diffused weighting matrix within the diffused weighting matrix, configuring a same value for pixels with the same Euclidean distance to the center of the diffused weighting matrix within the diffused weighting matrix and configuring a fixed value 1 for pixels which are vertical and horizontal four pixels nearest to the center of the diffused weighting matrix.

9. The image processing system of claim 8, wherein the reference image is a natural image with multiple color levels.

10. The image processing system of claim 8, further comprising an image output module coupled to the halftoning processing module for receiving and outputting the halftone image.

11. The image processing system of claim 8, wherein the diffused area sizes at least comprises sizes of 3×3, 5×5, 7×7 and 9×9.

12. The image processing system of claim 8, wherein the sizes of the class matrices at least comprise sizes of 8×8 and 16×16.

13. The image processing system of claim 8, wherein the halftoning processing module further divides the original image into a plurality of blocks with the first size and performs the dot diffusion process for each of the blocks according to the first class matrix, the first diffused area size and the diffused weighting of the first diffused weighting matrix to generate the halftone image.

14. The image processing system of claim 13, wherein the halftoning processing module further generates each pixel of the halftone image by the following formula:

$$v_{i,j} = x_{i,j} + x'_{i,j},$$

$$\text{where } x'_{i,j} = \sum_{m=-1}^{1} \sum_{n=-1}^{1} \frac{e_{i+m,j+n} \times h_{m,n}}{w},$$

$$e_{i,j} = v_{i,j} - b_{i,j},$$

$$\text{where } b_{i,j} = \begin{cases} 0, & \text{if } v_{i,j} < 128 \\ 255, & \text{if } v_{i,j} \geq 128, \end{cases}$$

wherein $x_{i,j}$ denotes the current processed input pixel value, $x'_{i,j}$ denotes the diffused error accumulated from neighboring processed pixels, $b_{i,j}$ denotes the binary output of the position (x,y), $v_{i,j}$ denotes the modified gray output, $e_{i,j}$ denotes the gray-level difference between the modified gray output $v_{i,j}$ and the binary output $b_{i,j}$, and $h_{m,n}$ denotes the diffused weighting corresponding to the pixel.

* * * * *